US006816729B1

(12) United States Patent
Halonen

(10) Patent No.: US 6,816,729 B1
(45) Date of Patent: Nov. 9, 2004

(54) HANDOVER METHOD

(75) Inventor: Timo Halonen, Torremuelle (ES)

(73) Assignee: Nokia Corporation, Espoo (FI)

( * ) Notice: Subject to any disclaimer, the term of this patent is extended or adjusted under 35 U.S.C. 154(b) by 479 days.

(21) Appl. No.: 09/654,986

(22) Filed: Sep. 5, 2000

Related U.S. Application Data

(63) Continuation of application No. PCT/FI99/00168, filed on Mar. 4, 1999.

(30) Foreign Application Priority Data

Mar. 6, 1998 (FI) ................................................. 980517

(51) Int. Cl.⁷ ................................................. H04Q 7/20
(52) U.S. Cl. ....................... 455/436; 455/437; 455/442; 455/443; 455/444
(58) Field of Search ............................... 455/436–444, 455/422, 560, 550, 500, 458

(56) References Cited

U.S. PATENT DOCUMENTS

| | | | |
|---|---|---|---|
| 5,239,667 A | | 8/1993 | Kanai |
| 5,422,933 A | | 6/1995 | Barnett et al. |
| 5,465,389 A | * | 11/1995 | Agrawal et al. ............ 455/33.2 |
| 5,722,072 A | * | 2/1998 | Crichton et al. ............ 455/437 |
| 5,734,984 A | * | 3/1998 | Reece et al. ................. 455/458 |
| 6,421,538 B1 | * | 7/2002 | Byrne .......................... 455/441 |
| 6,438,377 B1 | * | 8/2002 | Savolainen .................. 455/439 |

FOREIGN PATENT DOCUMENTS

| | | |
|---|---|---|
| EP | 0 812 119 A2 | 12/1997 |
| EP | 0 837 617 A2 | 4/1998 |
| GB | 2 287 858 | 9/1995 |
| GB | 2 295 943 | 6/1996 |
| WO | WO 97/29604 | 8/1997 |
| WO | WO 97/31487 | 8/1997 |
| WO | WO 98/27777 | 6/1998 |

OTHER PUBLICATIONS

International Search Report.

* cited by examiner

Primary Examiner—William Trost
Assistant Examiner—Meless Zewdu
(74) Attorney, Agent, or Firm—Squire, Sanders & Dempsey LLP

(57) ABSTRACT

The invention relates to a handover method, mobile system and apparatus deciding on the handover of the mobile system triggering an accelerated handover algorithm when the signal level and/or quality between the mobile station and a serving base transceiver station quickly drops. The method measures the level and/or quality of the signal between the base transceiver station and the mobile station, sets a predefined signal change as the trigger value, calculates the change in the signal level and/or quality, and if the change is at least equal to the trigger value, executes the first handover algorithm.

9 Claims, 3 Drawing Sheets

HANDOVER METHOD

This application is a continuation of Application No. PCT/FI99/00168, filed Mar. 4, 1999.

BACKGROUND OF THE INVENTION

The invention relates to the handover of a mobile station and especially to a quick handover from one cell to another in a micro-cellular network when the signal strength drops suddenly.

It is typical of cellular mobile systems that mobile stations can freely move and connect from one cell to another within the area of the mobile system. Crossover is just a re-registration to a new cell, when the mobile station does not have an ongoing call. When the mobile station does have an ongoing call during crossover, the call must also be connected from one base station to another with as little disturbance as possible. A crossover performed during a call is called handover. Handover may also take place within the cell from one traffic channel to another. To detect the need for handover in a mobile system and select the appropriate target cell, various measurements of connection quality are required as well as measurement of the field strengths of the adjacent cells. Handover from a serving cell to an adjacent cell may take place, for instance when the measurement results of the mobile/base station show a low signal level or quality in the current serving cell and a better signal level and/or quality is available in an adjacent cell. To ensure the stability of the mobile network, the measurement results and parameters used in handover are averaged within a certain time period. Thus handover becomes less susceptible to distorted measurement results caused by momentary interference or fading.

In urban-like conditions and especially in a network using microcells, the solution described above does not, however, react fast enough to a sudden drop in signal strength of the serving cell, for instance when a fast moving mobile station suddenly moves behind an obstacle in the terrain or a building. The measurement results are not real-time because they are averaged and there is a delay in reporting. The most suitable cell according to the latest measurement results may suddenly be obscured by an obstacle, which means that the signal it offers is no longer sufficient to maintain the call.

Finnish patent application FI 960857 provides one solution to obtaining real-time measurement results. The application describes a handover method where a real-time uplink signal measurement of the mobile station is initialized in the neighbouring base stations, when the level or quality of the signal in the serving base station has dropped below a predefined trigger value. The base station with the most suitable measurement values is then selected for handover, when the measured uplink signal value of the serving base station has dropped below a specific threshold value for handover.

The problem in the solution described above is that it is based on a predefined constant of the signal level and/or quality, which is the same indoors and outdoors. It is typical of a network using micro-cells, in particular, that the level and quality of the signal is extremely high outdoors and relatively low inside buildings. Thus in the above solution, a quick drop in the level or quality of the signal outdoors may go unnoticed, as the level and/or quality remains satisfactory and higher than the trigger value, even though a neighbouring base station could offer a better signal. Indoors the level and/or quality of the signal may continuously be below the trigger value causing a continuous real-time measuring of the neighbouring base stations, even though none of the base stations can provide a better signal.

BRIEF DESCRIPTION OF THE INVENTION

It is an object of the invention to provide a method and an apparatus implementing the method to solve the above-mentioned problems. The object is achieved by a method characterized by setting a predefined signal change as the trigger value, by calculating the change in the level and/or quality of the signal, and if the change is at least equal to the trigger value, by executing a first handover algorithm.

The term handover algorithm refers herein to the actions, calculations and comparisons including the handover criteria, which the operator has specified and according to which it is possible to decide when to handover, if it becomes necessary.

Another object of the invention is a mobile system where the method of the invention can be used. The mobile system is characterized in that it comprises calculation means to calculate the change in the level and/or quality of the signal, comparison means to compare the change in the signal level with a predefined trigger value, and execution means responsive to the comparison means to execute the handover algorithm.

A further object of the invention is an apparatus deciding on the handover in the mobile system, with which the method of the invention can be applied. The apparatus is characterized in that it is adapted to calculate the change in the level and/or quality of the signal between the mobile station and the serving base station and to execute the handover algorithm in response to a signal change at least equal to the predefined trigger value.

The invention is based on the idea that a signal change, such as an attenuation of a certain magnitude of the level and/or a drop of a certain magnitude of the quality, for instance the duplication of the bit error ratio, best indicates the need for handover.

Such a handover method provides the advantage that it immediately detects from a quick attenuation of the signal and/or a drop in quality, when handover is required and the most suitable cell can quickly be defined even in difficult environments and the handover can be executed without an extensive drop in the quality of the call.

The handover method of the invention further provides the advantage that the call can better be maintained with a quick handover to the most suitable base station and, at the same time, the number of handovers can be minimized. Another advantage of the handover method of the invention is that it is not necessary to keep checking for a possible handover in situations, where the signal is quite poor, but the best the environment can offer.

In a preferred embodiment of the invention the handover algorithm triggered by the signal change is only executed for a certain predefined period of time. This provides the advantage that the execution of a triggered handover algorithm ends at a certain point of time, even if the channel is not changed. Another advantage is that the handover algorithm is executed long enough to ascertain the necessity of the handover.

In a preferred embodiment of the invention one and the same operator-specified and normally applied handover algorithm is used in an accelerated mode for a certain time after it has been triggered. This provides the advantage that only one algorithm is required and, by simply changing the parameter values, it can be changed to a faster and more real-time algorithm suitable for a difficult environment.

The preferred embodiments of the method, system and apparatus of the invention are described in the appended dependent claims 2, 3, 4, 6, 7 and 9.

BRIEF DESCRIPTION OF THE DRAWINGS

In the following the invention will be described in greater detail in connection with preferred embodiments, with reference to the attached drawings, in which.

DETAILED DESCRIPTION OF THE INVENTION

The present invention can be applied to any cellular mobile system, such as the world-wide system, Universal Mobile Telephone System (UMTS), being developed. In the following the invention will be described in detail in connection with the digital pan-European mobile system, Global System for Mobile Communication (GSM).

Figure 1:
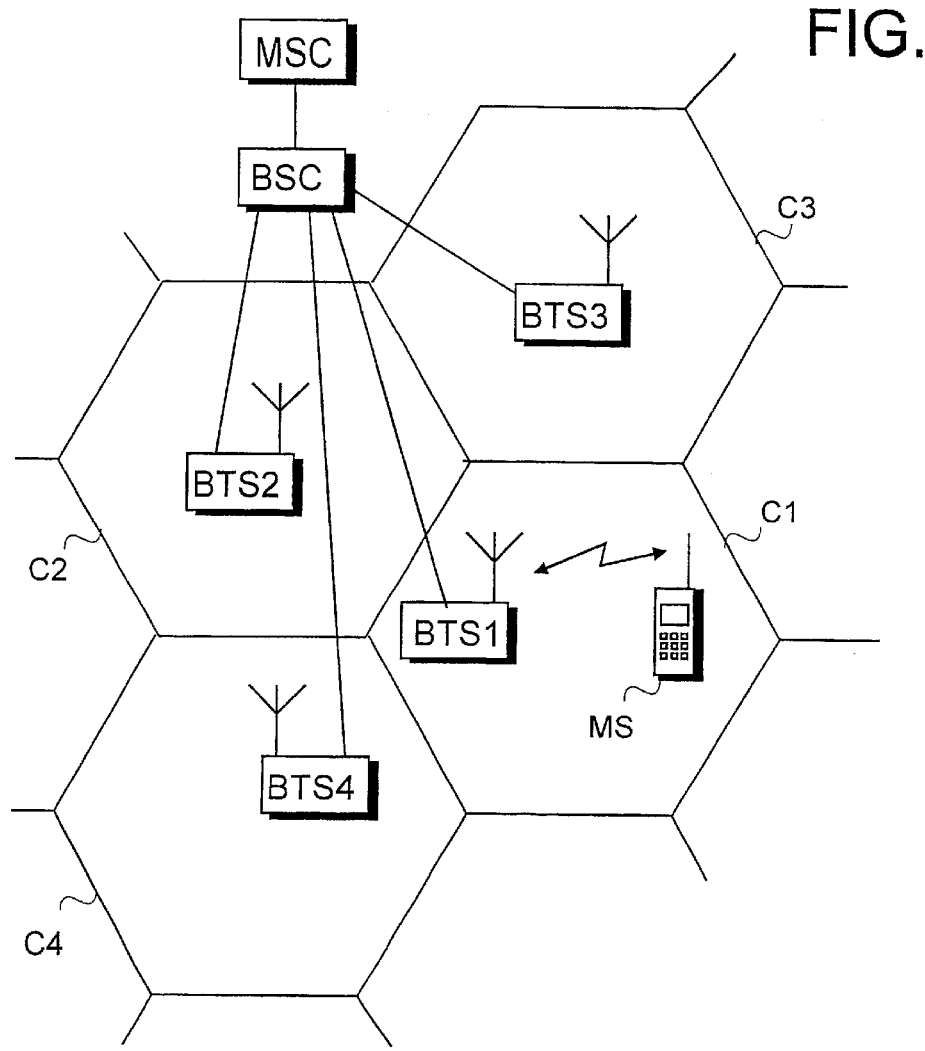
FIG. 1 shows a simplified block diagram of a mobile system.

FIG. 1 shows a simplified block diagram of the pan-European GSM system. A mobile station MS is connected to a base transceiver station BTS, in the case of FIG. 1, to BTS1, over a radio path. A base station system BSS comprises a base station controller BSC and the base transceiver stations BTS under its control. Generally, there is only one base transceiver station BTS for one cell C. The radio cells C overlap slightly, even though in FIG. 1, they have been drawn clearly defined for clarity's sake. Also, the form of the cells is actually not as regular as in FIG. 1. A mobile services switching centre MSC usually has several base station controllers BSC under its control. The mobile services switching centre is connected to other mobile services switching centres and to a public telephone network that are not shown in FIG. 1. In a GSM system, subscriber registers include at least a home location register HLR and a visitor location register VLR that are not shown in FIG. 1. The subscriber information of a mobile station is permanently recorded in the home location register of the system and temporarily in the visitor location register, in whose area the mobile station is at the time.

The mobile station continuously measures the signals of the base transceiver stations closest to its location for a possible handover. For instance in a GSM network, a mobile station can in addition to the serving base transceiver station simultaneously measure the signal level and/or quality of up to 32 other base transceiver stations. The serving base transceiver station informs the mobile station of the neighbouring base transceiver stations to measure. The measurement results of each base transceiver station are identified by a base station identity code BSIC. The base transceiver station measures continuously the signal level and quality of all ongoing radio links in the station. The mobile station sends regularly measurement results as a report message through the serving base transceiver station, in the case of FIG. 1, through BTS1, to the base station controller BSC. The report message contains the measurement results of the serving base transceiver station and those of up to six best neighbouring base transceiver stations. Correspondingly, the base transceiver station sends its own measurement results to the base station controller. In the GSM recommendations, the reporting rate of the measurement results is at least once a second. In most applications, the mobile station reports the measurement results at intervals of 480 ms.

Handover from a serving cell to one of the adjacent cells or to another channel in the serving cell is made when the handover criteria set by the operator are met. Generally used handover criteria are signal level and quality of the radio link, signal level of the originating cell and the target cell, and the transmission power required of and allowed to the mobile station in the target cell. Other criteria may also be set. To ensure the stability of the mobile network, the measurement results and other criteria used in handover are averaged. Thus handover becomes less susceptible to distorted measurement results caused by momentary interference or fading.

The base station controller makes the decisions related to handover. If the target cell is under the control of another base station controller, the handover is controlled by the mobile services switching centre. Handover decisions can also be centralised to the mobile services switching centre. When necessary, the base station controller gives the handover command through the serving base transceiver station to the mobile station. The handover command can also be given through the base transceiver station of the target cell.

Figure 2:
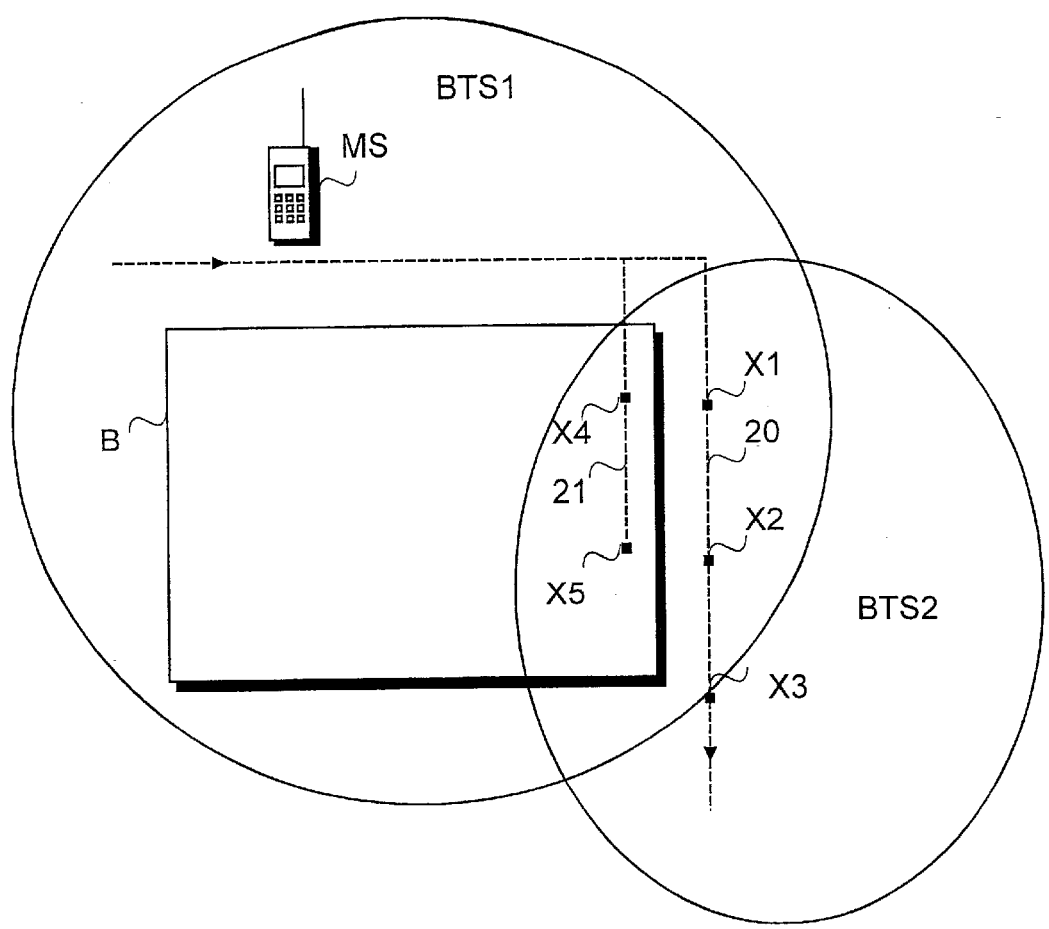
FIG. 2 illustrates a handover situation.

FIG. 2 shows an example of a handover situation where a building B restricts the propagation of the signals of the base transceiver stations BTS1 and BTS2. Let us assume that the mobile station MS moves in a cell of the base transceiver station BTS1 along a route 20 drawn in FIG. 2 and does not enter the building. At a location X1, the signal between the mobile station MS and the base transceiver station BTS1 has attenuated by the trigger value of attenuation, for instance 30 dB. The base station controller initiates the handover algorithm which in a first preferred embodiment is an accelerated normal handover algorithm. In such a case, the averaging of the measurement results is carried out with a smaller number of measurement results using, for instance, the last two measurements. Diverging from solutions of prior art, the handover algorithm is initiated at the location X1, even though the level of the signal is still relatively high. The only requirement is that it has attenuated at least by the trigger value. When the mobile station has moved on to a location X2, either a handover to the base transceiver station BTS2 has taken place or is currently being made, or the mobile station has stayed at the base transceiver station BTS1, because its signal is better than that of the base transceiver station BTS2. However, in the latter case, the attenuation of the signal re-triggers the accelerated handover algorithm. In all cases, when the mobile station passes a location X3, it has made a handover to the base transceiver station BTS2. This way, monitoring the attenuation of the signal ensures that the handover decision is made at some point, when the signal continues to attenuate. Additionally, the decision is made immediately, when the neighbouring base transceiver station offers a better signal.

Correspondingly, if the mobile station moves along a route 21 and enters a building B, the attenuation limit value is triggered at a location X4, after which an accelerated handover algorithm is executed. Whether the mobile station changes from the base transceiver station BTS1 to the base transceiver station BTS2 is entirely dependent on the signal levels and the handover criteria specified by the operator. As the field strength is generally relatively constant inside a building, the accelerated handover algorithm is not. triggered when the mobile station moves along the route 21 to a location X5, but the mobile station stays connected to the same base transceiver station. A quick and extensive attenuation of the signal level is thus detected, when entering a building, and an "alarm status" is initiated, that is, the best possible target cell is selected with the accelerated handover algorithm. Naturally, the mobile station cannot know what causes the big drop in the signal level. After this, the normal handover algorithm again takes over and a continuous "alarm status" is not used inside the building. In a solution of a prior art patent application, an intensified monitoring of the neighbouring base transceiver stations could possibly be performed inside a building, as the field inside the building is probably below the fixed limit that triggers the monitoring of neighbouring stations. If this were not the case, there would be no handover monitoring when entering a building.

Systems using the code division multiple access (CDMA) method include a soft handover in addition to the hard handover used in systems like GSM. In the soft handover, the mobile station can during handover be linked to the network through several base transceiver stations until one of them proves to be better than the others on the basis of its signal. With the invention, the duration of a soft handover can be shortened, which reduces the network load especially in cases, where the mobile station is indoors where none of the base transceiver stations can offer a clearly better signal than the others. When the attenuation of the signal is not noticeable any more (that is, the signal change is small), the best base transceiver station is selected and used.

Figure 3:
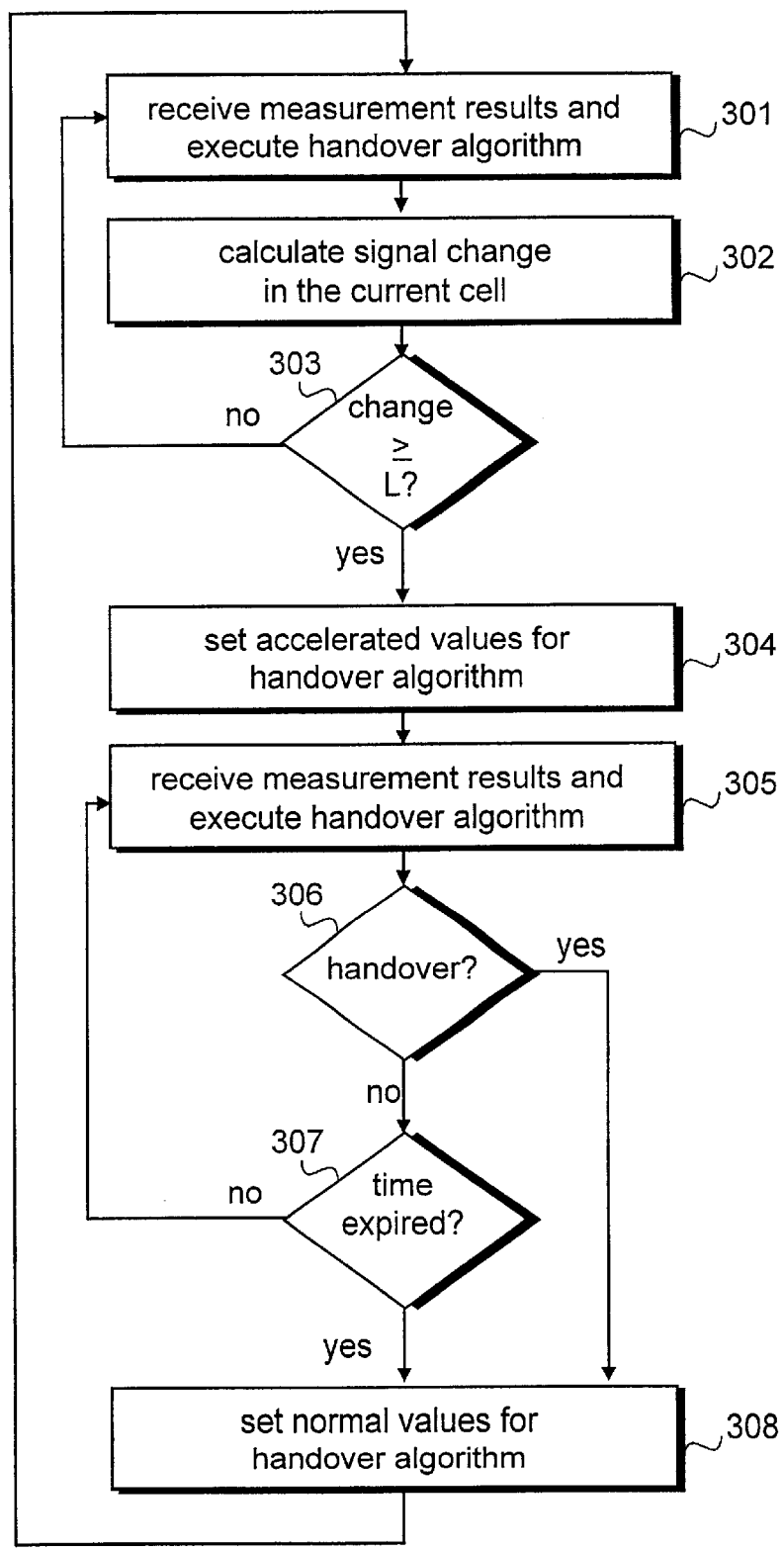
FIG. 3 is a flow chart of a preferred embodiment of the invention.

FIG. 3 shows the first preferred embodiment of the invention in a flowchart. The presented functionality is placed, for instance, in the base station controller BSC. The serving base transceiver station and the mobile station measure continuously the level of the signal between them. The mobile station also measures the signal levels of the neighbouring base transceiver stations. The base station controller BSC receives the measurement results from the base transceiver station which also forwards the measurement results of the mobile station and executes an operator-specified conventional handover algorithm with normal values in step 301. At the same time, the change in the signal between the serving base transceiver station and the mobile station is calculated from the measurement results in step 302. The change is calculated preferably as a change which has taken place during the time predefined by the operator. The predefined time helps distinguish between the fast and the slower changes by monitoring the change using, for instance, averaging windows whose size is half of the normal size. In step 303, the signal level is checked to see if it has changed at least by the trigger value L predefined by the operator during the time period predefined by the operator, for instance if the signal has attenuated by 30 dB. If the signal change is less than the trigger value, the steps of the method are continued from step 301. Otherwise, the next step is 304, in which new values are set for the handover algorithm parameters accelerating the algorithm. An example of this value is the size of the window used in averaging that can be reduced to a fraction of the earlier, for instance by calculating the average of only the two latest results or by using only the latest measurement result. In step 305, measurement results are received and the handover algorithm is executed with the new parameters. At the same time, a check is made, whether handover took place in step 306 and if not, in step 307, it is checked if the predefined time for the accelerated handover has expired. If it has not expired, operation is continued from step 305. If handover has taken place in step 306 or if the time has expired in step 307, operation continues from step 308 where normal values are set for the parameters of the handover algorithm, for instance by restoring the size of the window used in averaging. After this, operation is continued from step 301.

In the first preferred embodiment, handover is generally made on the basis of the signal power, but other reasons may also cause handover, even though a drop in the signal level has initiated the use of an accelerated handover algorithm. In the other embodiments of the invention, a change in the quality of the signal between the mobile station and the serving base transceiver station can be monitored in addition to or instead of a change in the signal level. In this case, the trigger value L, with which the change is compared in step 303 to start and execute handover, is based on a change in the signal quality, such as the bit error ratio BER, or the combined effect of a change in the signal level and quality.

The criteria to decide to start measurements and handover are, however, not limited to the above-mentioned examples. They can be any criteria suitable for handover, whose change can be calculated. The invention does not in any way limit the calculation method of the change.

In some embodiments of the invention, completely different algorithms can be used in steps 301 and 305, in which case, steps 304 and 308 can be left out. It is also possible to use the handover algorithm only in step 305, in which case, steps 304 and 308 can be left out and step 301 only includes reception of the measurement results. In the latter alternative, also step 307 can be left out. It is also possible to set several different trigger values which allow the use of different handover algorithms. For instance, a 15-dB drop in the signal level could trigger an averaging window size 6 for the handover algorithm, a drop between 15 dB and 30 dB could set the window size to 3 and a drop of at least 30 dB in the signal level could set the window size to 1. The invention does not in any way limit the handover algorithms and decision criteria used. It is essential that a handover algorithm is triggered on the basis of a predefined change value.

Figure 4:
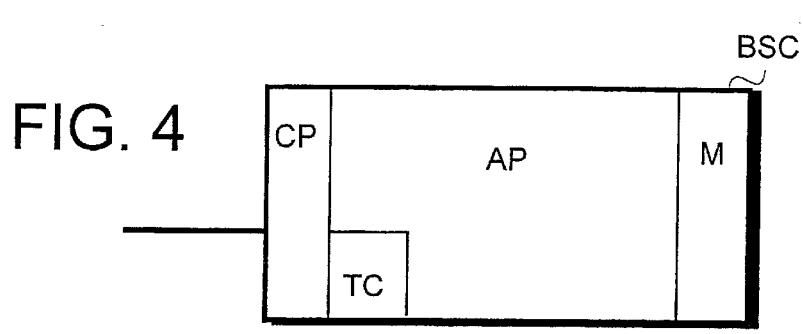
FIG. 4 shows a simple block diagram of the apparatus of the invention.

FIG. 4 shows a schematic block diagram of the apparatus of the invention making the handover decisions, such as the base station controller BSC of a GSM system. The apparatus executes the steps of the method described above in connection with FIG. 3. The apparatus comprises a connection part CP to receive the measurement results and to send the handover command. In addition, the apparatus comprises an application part AP to execute different handover algorithms or the same algorithm with different values. The application part AP instructs the connection part CP to send the handover command when the handover criteria predefined by the operator are met. The application part AP calculates the change in the signal from the measurement results and compares it to the trigger values. The trigger values are preferably stored in the memory M of the apparatus. Measurement results and parameter values as well as the handover criteria including their values can also be stored in the memory. The apparatus may comprise a time calculator TC which helps the application part AP to stop the execution of a time-limited handover algorithm.

It will be understood that the foregoing description and the related figures have been presented only to illustrate the present invention. It will be apparent to those skilled in the art that various variations and modifications can be made to the invention without departing from the spirit and scope thereof, which is defined by the appended claims.

What is claimed is:

1. A handover method comprising:
   measuring a level and/or quality of a signal between a base transceiver station and a mobile station, setting a predefined trigger value for an extent of a change in the signal, calculating an extent of a change in the signal level and/or quality, and if the calculated extent of the change in the signal is at least equal to the predefined trigger value, executing a first handover algorithm.

2. A method as claimed in claim 1, wherein the first handover algorithm is executed for a predefined time during which either handover is made to another cell or the mobile station remains in the same cell after the time has expired.

3. A method as claimed in claim 1, wherein a second handover algorithm is executed when the first handover algorithm is not executed.

4. A method as claimed in claim 3, wherein the first and second handover algorithm differ from each other only by the parameter values used in the handover decision.

5. A mobile system, in which a signal level and/or quality of a serving base transceiver station and a mobile station is measured, the system comprising calculation means to calculate an extent of a change in the signal level and/or the quality, comparison means to compare the calculated extent of the change with a predefined trigger value for an extent of a change in the signal, and execution means to execute a handover algorithm responsive to the comparison means.

6. A mobile system as claimed in claim 5, wherein the execution means have been set to execute the handover algorithm for a predefined time.

7. A mobile system as claimed in claim 5, wherein the execution means have been set to execute the handover algorithm with a first value for a predefined time in response to the comparison means and otherwise to execute the handover algorithm with a second value.

8. An apparatus deciding on handover between the channel of a mobile station and a base transceiver station, the apparatus being set to calculate an extent of a change in a signal level and/or quality between the mobile station and the serving base transceiver station and to execute a handover algorithm in response to a calculated extent of a change in the signal corresponding to at least a predefined trigger value for an extent of a change in the signal.

9. An apparatus as claimed in claim 8, the apparatus being set to execute in response to a calculated extent of a change in the signal of at least said predefined trigger value, the handover algorithm with a first value for a predefined time and, in response to a handover from one cell to another or to expired time, to calculate said extent of a change in the signal level and/or the quality and execute the handover algorithm with a second value.

* * * * *